(12) United States Patent
Wade, Jr. et al.

(10) Patent No.: US 7,859,998 B2
(45) Date of Patent: Dec. 28, 2010

(54) SYSTEM AND METHOD FOR MANAGING PRE-EMPTION OF QUALITY OF SERVICE (QOS) ALLOCATIONS IN A NETWORK

(75) Inventors: Steven A. Wade, Jr., Portland, OR (US); Junsei Sato, Chiba (JP)

(73) Assignee: Sharp Laboratories of America, Inc., Camas, WA (US)

( * ) Notice: Subject to any disclaimer, the term of this patent is extended or adjusted under 35 U.S.C. 154(b) by 571 days.

(21) Appl. No.: 11/764,335

(22) Filed: Jun. 18, 2007

(65) Prior Publication Data

US 2008/0310301 A1 Dec. 18, 2008

(51) Int. Cl.
*H04L 12/54* (2006.01)
(52) U.S. Cl. .................................. 370/230; 370/235
(58) Field of Classification Search .............. 370/237, 370/395, 6, 947, 409, 225, 468, 254, 235, 370/395.21
See application file for complete search history.

(56) References Cited

U.S. PATENT DOCUMENTS

| | | | |
|---|---|---|---|
| 6,212,562 B1 | 4/2001 | Huang | |
| 6,947,409 B2 * | 9/2005 | Iwamura | 370/345 |
| 6,956,821 B2 * | 10/2005 | Szviatovszki et al. | 370/237 |
| 6,970,422 B1 | 11/2005 | Ho et al. | |
| 7,076,552 B2 | 7/2006 | Mandato | |
| 7,254,141 B1 * | 8/2007 | Desai et al. | 370/468 |
| 2003/0117951 A1 * | 6/2003 | Wiebe et al. | 370/225 |
| 2004/0264500 A1 * | 12/2004 | Bansal et al. | 370/468 |
| 2006/0182065 A1 | 8/2006 | Petrovic et al. | |
| 2006/0182119 A1 * | 8/2006 | Li et al. | 370/395.52 |
| 2006/0250961 A1 * | 11/2006 | Vasseur | 370/235 |
| 2007/0195715 A1 * | 8/2007 | Yamano et al. | 370/254 |
| 2007/0253427 A1 * | 11/2007 | Stirbu | 370/395.21 |

FOREIGN PATENT DOCUMENTS

WO 2006127328 A1 11/2006

OTHER PUBLICATIONS

UPnP QoS Architecture:2, Oct. 16, 2006.
UPnP QosManager:2, Oct. 16, 2006.

* cited by examiner

*Primary Examiner*—Steven H Nguyen
*Assistant Examiner*—Syed Bokhari
(74) *Attorney, Agent, or Firm*—Thomas R. Berthold

(57) ABSTRACT

A system and method manages Quality-of-Service (QoS) in a network by allocating resources, such as available network bandwidth. The network devices transmit and receive data traffic streams, each of which includes QoS parameters, including a priority level and bandwidth allocation. The method includes choosing which existing QoS allocations are pre-empted, notifying original requesters of pre-empted allocations, and re-establishing pre-empted allocations with appropriate modifications. If a new QoS request cannot be accommodated due to the previous allocations to lower-priority requesters, the existing lower-priority allocations are released until enough allocations are released to accommodate the new request. Once the new request is allocated, the pre-empted configurations may be reallocated.

10 Claims, 3 Drawing Sheets

SYSTEM AND METHOD FOR MANAGING PRE-EMPTION OF QUALITY OF SERVICE (QOS) ALLOCATIONS IN A NETWORK

BACKGROUND OF THE INVENTION

1. Field of the Invention

This invention relates generally to networks that require Quality-of-Service (QoS) parameters for data traffic streams, including streaming audio and/or video (audio-video or "AV"), and more particularly to a system and method for managing QoS resources, such as available network bandwidth.

2. Description of the Related Art

Quality-of-Service (QoS) in the field of packet-switched networks refers to a broad collection of networking capabilities and techniques to assure that a packet succeeds in passing between two points in the network. QoS elements of network performance typically include bandwidth (throughput), latency (delay), and error rate. The goal of QoS is to improve the user experience of a network's ability to deliver predictable results for sensitive applications. Certain types of network traffic streams, such as streaming AV, may require QoS to guarantee throughput. These types of traffic require a certain level of bandwidth to function—any more than required is unused, and any less will render the service non-functioning.

QoS is becoming increasingly important in local area networks (LANs) used in the home. These home LANs may use a wide variety of existing cabling or non-engineered placement of wireless access points with technologies that have varying underlying bandwidth. Home LANs tend to use applications that are AV-intensive with different bandwidth characteristics and typically include consumer electronic (CE) devices like stereo receivers, digital video recorders (DVRs), digital TVs and AV servers. Home LANs typically include wired LANs, like 10/100baseT Ethernet, and wireless local area networks (WLANs), such as those based on the well-known IEEE 802.11 or Wi-Fi standards. Other types of WLANs include ultrawideband (UWB) networks that have a fairly short range but very high throughput. Another type of LAN, one that does not use wireless transmission, is a powerline communications (PLC) network that uses the existing electrical wiring in a home or single building, such as a PLC network based on the HomePlug™ standard.

In any network with managed QoS, including home LANs with AV applications, there are scenarios in which multiple requesters compete for QoS resources such as bandwidth. In the case where all requested traffic streams have equal priority the bandwidth is allocated on a first-come-first-serve basis. However, in the case where a high-priority request is made after the needed bandwidth is already allocated to lower-priority requestors, existing allocations must be pre-empted to accommodate the new high priority request. The need to pre-empt lower-priority allocations raises issues such as which existing allocations are pre-empted, can they be at least totally or partially reallocated, and how original requestors of pre-empted allocations should be notified. It is important to have a robust and efficient method to address these issues or diminished user experience and excessive messaging may occur in the network. Additionally, problems such as race conditions and QoS violations may arise.

What is needed is a system and method for managing pre-emption and reallocation of QoS allocations in a network in an efficient and non-disruptive manner.

SUMMARY OF THE INVENTION

The invention relates to a system and method for managing Quality-of-Service (QoS) in a network by allocating resources, such as available network bandwidth. The network devices transmit and receive data traffic streams, each of which includes QoS parameters, including a priority level and bandwidth allocation. The method includes choosing which existing QoS allocations are pre-empted, notifying original requestors of pre-empted allocations, and re-establishing pre-empted allocations with appropriate modifications. If a new QoS request cannot be accommodated due to the previous allocations to lower-priority requesters, the existing lower-priority allocations are released until enough allocations are released to accommodate the new request. Once the new request is allocated, the pre-empted configurations may be reallocated.

When a network device requests a new traffic stream with a high-priority level and a bandwidth allocation greater than the available network bandwidth, all traffic streams on the network having the lowest of the priority levels that are lower than the priority level of the requested new traffic stream are identified. The lowest-priority level allocation having an allocation equal to or greater than the additional required bandwidth is then pre-empted. If there is no one lowest-priority level allocation having an allocation equal to or greater than the additional required bandwidth, then the allocations of lowest-priority level allocations are pre-empted until the sum of pre-empted allocations is equal to or greater than the additional required bandwidth. This process repeats with the identification of the next-lowest priority level allocations until enough allocations have been pre-empted to provide the additional required bandwidth, at which time the additional required bandwidth is allocated to the requested new traffic stream.

The method may include notifying all devices whose allocations will be pre-empted and reallocating a pre-empted allocation if its required allocation is less than the available network bandwidth, with the first reallocation being the pre-empted traffic stream having the highest priority level. If a pre-empted allocation is for a traffic stream that is available in another format that requires lesser bandwidth than the original format, then the traffic stream may be reallocated if the other format requires bandwidth less than the available network bandwidth.

For a fuller understanding of the nature and advantages of the present invention, reference should be made to the following detailed description taken together with the accompanying figures.

DETAILED DESCRIPTION OF THE INVENTION

The invention will be described for a home LAN based on the UPnP architecture, and in particular to a home LAN that includes multiple devices and is capable of distributing an AV traffic stream between a serving device and a rendering device. However, the invention is fully applicable to other types of network architectures distributing other types of traffic streams. UPnP technology is defined in "UPnP Device Architecture, Version 1.0," and is built upon Internet Protocol (IP), Transmission Control Protocol (TCP), User Datagram Protocol (UDP), Hypertext Transfer Protocol HTTP, and Extensible Markup Language (XML). UPnP technology defines two AV devices, a media server and a media renderer. The user must be able to browse the AV media items stored on the media server or available for transmission from the media server, select a specific item, and cause it to be played on the media renderer. For ease of explanation the invention will be described using QoS concepts and syntax as described in "UPnP QoS Architecture:1.0, Mar. 10, 2005" and "QosManager:1, Mar. 10, 2005".

Figure 1:
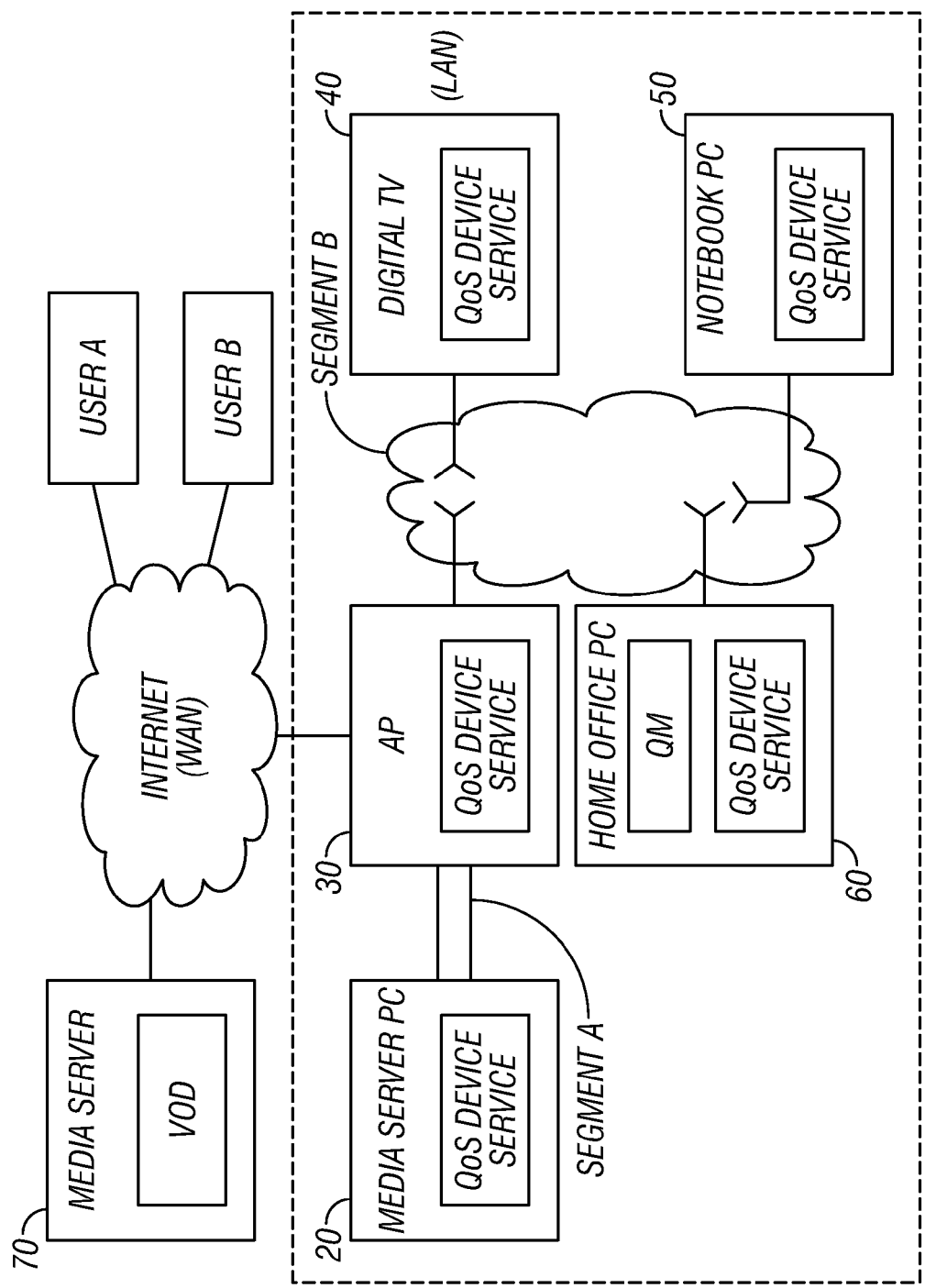
FIG. 1 is a block diagram of a home LAN with network devices having QoS capability and connected to a wide-area network (WAN) like the Internet.

FIG. 1 shows an example of a LAN with a Media Server PC 20, a digital TV 40, an access point (AP) device 30, a notebook PC 50 and a home office PC 60. The LAN is shown with two different network segments. Segments A and B may be, for example, Ethernet, IEEE 802.11e or 802.3, UWB or PLC networks. In one example, for ease of understanding, Segment A may be an Ethernet network connecting the Media Server PC 20 to the AP 30, and Segment B may be a wireless IEEE 802.11e network connecting the AP 30, digital TV 40, notebook PC 50 and home office PC 60. In the example of FIG. 1, the home LAN is connected to a wide area network (WAN) such as the Internet, for example by a cable modem connect to AP 30. The WAN is shown as also including an entertainment provider's server 0 that supplies a video-on-demand (VOD) for downloading over the Internet, and users A and B who may access the Internet for AV traffic, such as video-conferencing with other users.

As a typical example of a traffic stream on the network, the user of the home office PC 60, for example an adult residing in the home, may be required to conduct video-conferencing over the Internet with users A and/or B. Similarly, the user of the notebook PC 50, for example a teenager residing in the home, may request video or still images stored on the media server PC 30 or downloading of files from the Internet for a school project, and the user of the digital TV 40, for example a child residing in the home, may request a cartoon VOD from server 70. For each traffic stream, QoS parameters are established. These include a priority level and an allocated bandwidth.

As shown in FIG. 1, each of the devices on the LAN includes a QoS Device Service, which enables the device to implement QoS parameters, including required bandwidth and a priority level. At least one of the network devices, for example the home office PC 60, also includes a QoS Manager (QM). The QM can be located in one or more other network devices. The QoS Device Service and QM are software modules or components of executable code located within memory of the device. Each of the devices includes a processor, e.g., microprocessor, microcontroller or digital signal processor (DSP), that performs logical and arithmetic operations based on program instructions stored in memory of the device, and is thus capable of performing the functions of the QM and Qos Device Service that it may contain.

The QM is responsible for setting up, updating, revoking and in general controlling the QoS assigned by networking devices to various traffic streams, and acts as a control point to the QoS Device Service on each network device. The QM discovers the QoS Device Services on the network, and gets information about the current state of each enabled device from a TrafficDescriptor. The TrafficDescriptor is the representation of the traffic stream structure. The TrafficDescriptor includes a portion called Traffic Specification (TSPEC). TSPEC is represented in the form of an XML structure and includes a TrafficClass, which is a variable assigned to the type of traffic, for example, Network Control, Voice, Gaming, AV, Images, or Data. When a QM completes setting up a traffic stream, the traffic related information is stored in the QoS Device Services on the traffic stream's path (source, intermediate, and/or sink). All QoS Devices Services in the network path will store the TrafficDescriptor. Consequently, any QM can query the QoS Device Services and determine the state of the traffic stream.

In the conventional method proposed in UPnP, after a traffic stream has been established, the QM receives its TrafficDescriptor and assigns a priority level based on the TrafficClass. For example, priority levels may be 0 to 7, with 7 being the highest. The priority level is the TrafficImportanceNumber (TIN) and is recorded in the TrafficDescriptor. For example, the TINs may be assigned as follows: Network Control (7), Voice (6), Gaming (6), AV (5), Images (3), and Data (0). The QM conveys these parameters to the devices and then the QoS Device Service in each device configures the device. The internal mechanism used by the QoS Device Service for applying the TIN is typically by tagging the packets to be transmitted. For example, in a HomePlug™ network four priority levels are defined by the standard, so the TIN would be converted to one of these priority levels.

The TSPEC may also include the source/format in which the content of the traffic stream is available. For example, a requested VOD traffic stream might be available in either high definition (HD) format or standard definition (SD) format and would have a TSPEC describing each. They are in priority order so the QM would first try to allocate bandwidth for the HD stream, and failing that, the SD stream.

In any network with managed QoS, such as a UPnP home LAN, there are scenarios in which multiple requestors compete for QoS resources such as bandwidth. (As used herein in the context of a communications network, "bandwidth" means essentially "throughput" or channel capacity, i.e., the amount of discrete information that can be reliably transmitted over a channel). For example, there may be multiple QoS Managers (QMs) that are handling QoS allocations on behalf of various devices. Once the pre-empting QM begins pre-empting existing allocations, the owners of the original allocations may be notified (i.e., UPnP QoS release events). These owners of pre-existing allocations may attempt to re-establish their allocations upon receipt of these notifications. When this occurs, there is no need for the pre-empting QM to attempt to re-establish QoS for the pre-empted pre-existing allocations since the original owner has already done that.

In the case where all requested traffic streams have equal priority the bandwidth is allocated on a first-come-first-serve basis. However, in the case where a high-priority request is made after the needed bandwidth is already allocated to lower priority requesters, existing allocations must be pre-empted to accommodate the new high-priority request. For example, in the network of FIG. 1, all or a substantial portion of the available network bandwidth may be taken up the users of digital TV 40 and notebook PC 50 when the user of home office PC 60 attempts to establish a higher-priority video conference over the Internet. The need to pre-empt lower-priority allocations raises issues such as which existing allocations are pre-empted, can they be at least totally or partially reallocated, which QMs should be invoked to handle this pre-emption, and how original requestors of pre-empted allocations should be notified.

It is important to have a robust and efficient method to address these issues or diminished user experience and excessive messaging may occur in the network. Additionally, problems such as race conditions and QoS violations may arise. A race condition occurs when multiple QMs are competing for a resource or performing an operation in such a way as to interfere with each other. For example, in a poorly designed QoS framework, QM A might pre-empt QM B's allocation to make room for it's own, which triggers QM B to pre-empt QM A's new allocation to reallocate its pre-empted allocation, which would trigger QM A to do the same again, etc. A QoS violation occurs when an admitted allocation can no longer be honored, usually due to a change in total network capacity or other resources. For example, the total bandwidth available on a PLC network might drop off considerably when an interfering electrical device such as a microwave oven is powered on. Or a wireless network's capacity might drop due to nearby electromagnetic interference (EMI).

This invention is a method and system for choosing which existing QoS allocations are pre-empted, notifying original requesters of pre-empted allocations, and re-establishing pre-empted allocations with appropriate modifications. If a new QoS request cannot be accommodated due to the previous allocations to lower-priority requesters, the existing lower-priority allocations are released until enough resources are released to accommodate the new request. Once the new request is allocated, the pre-empted configurations are reallocated.

However, before any pre-emption is performed, the network is checked to determine if there are sufficient resources, taking into account that only lower-priority allocations can be pre-empted. If a best-case scenario does not yield enough resources to accommodate the new request, for example if all existing lower-priority traffic streams have a total bandwidth less than the additional bandwidth required for the newly-requested traffic stream, then the new request cannot be allocated and pre-emption is not necessary.

The method of the invention will be described below and with reference to the flow charts of FIGS. 2 and 3.

Figure 2:
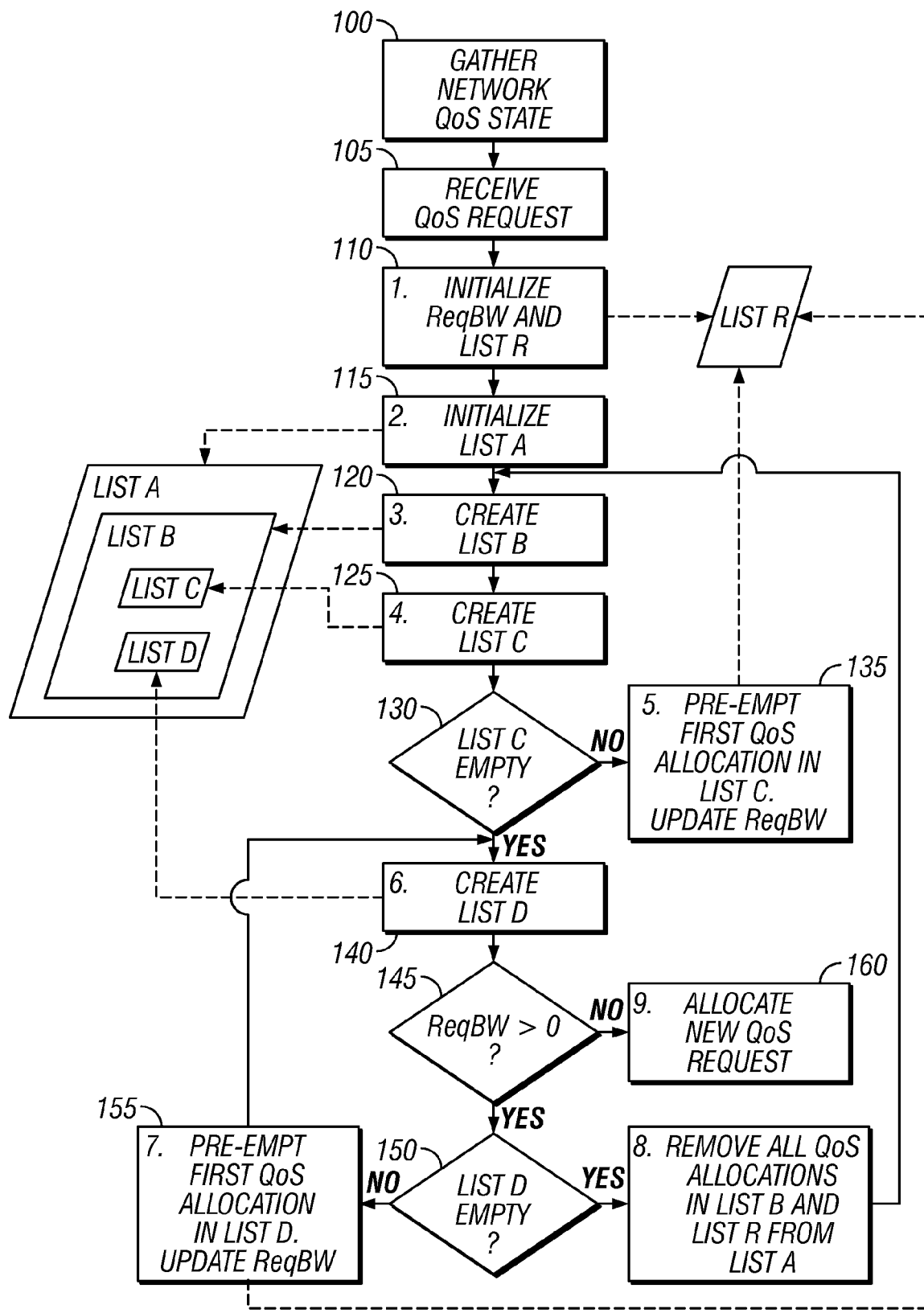
FIG. 2 is a flow chart illustrating the method of pre-empting network allocations according to this invention.

Pre-Emption Method (FIG. 2)

First, gather network QoS state (block 100) by identifying all traffic streams, their priority levels and their bandwidth allocations. Then receive new QoS request (block 105) with priority level and required bandwidth.

1. Initialize ReqBW and List R (block 110). "ReqBW" is defined as the amount of additional bandwidth needed to accommodate the new QoS request. This value will be updated as existing QoS allocations are pre-empted to reflect the amount of additional bandwidth made available by the pre-emption. List R is the list of all pre-empted allocations and is initially empty.

2. Initialize List A (block 115). List A is the list of all existing QoS allocations with a lower priority level than the new request, sorted in ascending order of priority.

3. Create List B (block 120). List B is the group of all existing QoS allocations with the lowest priority level in List A. For example, if the lowest priority level in List A is priority level 0, for example corresponding to a "Data" TrafficClass in the above UPnP example of QoS management, then List B will contain all of the QoS allocations with priority level 0 from List A.

4. Create List C (block 125). List C is the group of all QoS allocations in List B that require more than ReqBW, sorted in ascending order of bandwidth allocation size.

Then, at block 130, determine if List C is empty.

5. If List C is not empty pre-empt the first QoS allocation in List C (block 135). Add this pre-empted allocation to List R, the list of pre-empted QoS allocations, update ReqBW and go to step 9.

6. If List C is empty, create List D (block 140). List D is the group of all QoS allocations in List B that require less than ReqBW, sorted in descending order of bandwidth allocation size.

7. Then as long as ReqBW is greater than zero (block 145) and List D is not empty (block 150), pre-empt the first QoS allocation in List D, add it to List R, and update ReqBW (block 155).

If at decision block 145, ReqBW is zero or less, go to step 9.

8. If at decision block 150, List D is empty, remove all QoS allocations in List B and List R from List A. Go to step 3. This means that all of the lowest-priority level allocations have been pre-empted and the process of steps 3 through 7 will now be repeated for allocations with the next-lowest priority level.

9. Allocate the new QoS request (block 160).

As part of the above process, an optional additional step may include notifying original requesters of the imminent pre-emption and the resources being allocated for the new request. This will give the original requestors an opportunity to handle their own reallocations proactively, before the new requester begins consuming resources. For example, the QoS Device Service of digital TV 40 (FIG. 1) may be receiving an AV traffic stream in HD format and, upon receipt of an imminent pre-emption notification from the QM, switch the traffic stream to SD format. This will allow for a more fluid transition to the reduced resources for the pre-empted requester and a better QoS experience for all users.

The method of this invention may also include a method for attempting to reallocate pre-empted allocations after the new QoS request has been allocated. This method will be explained below with the flow chart of FIG. 3.

Figure 3:
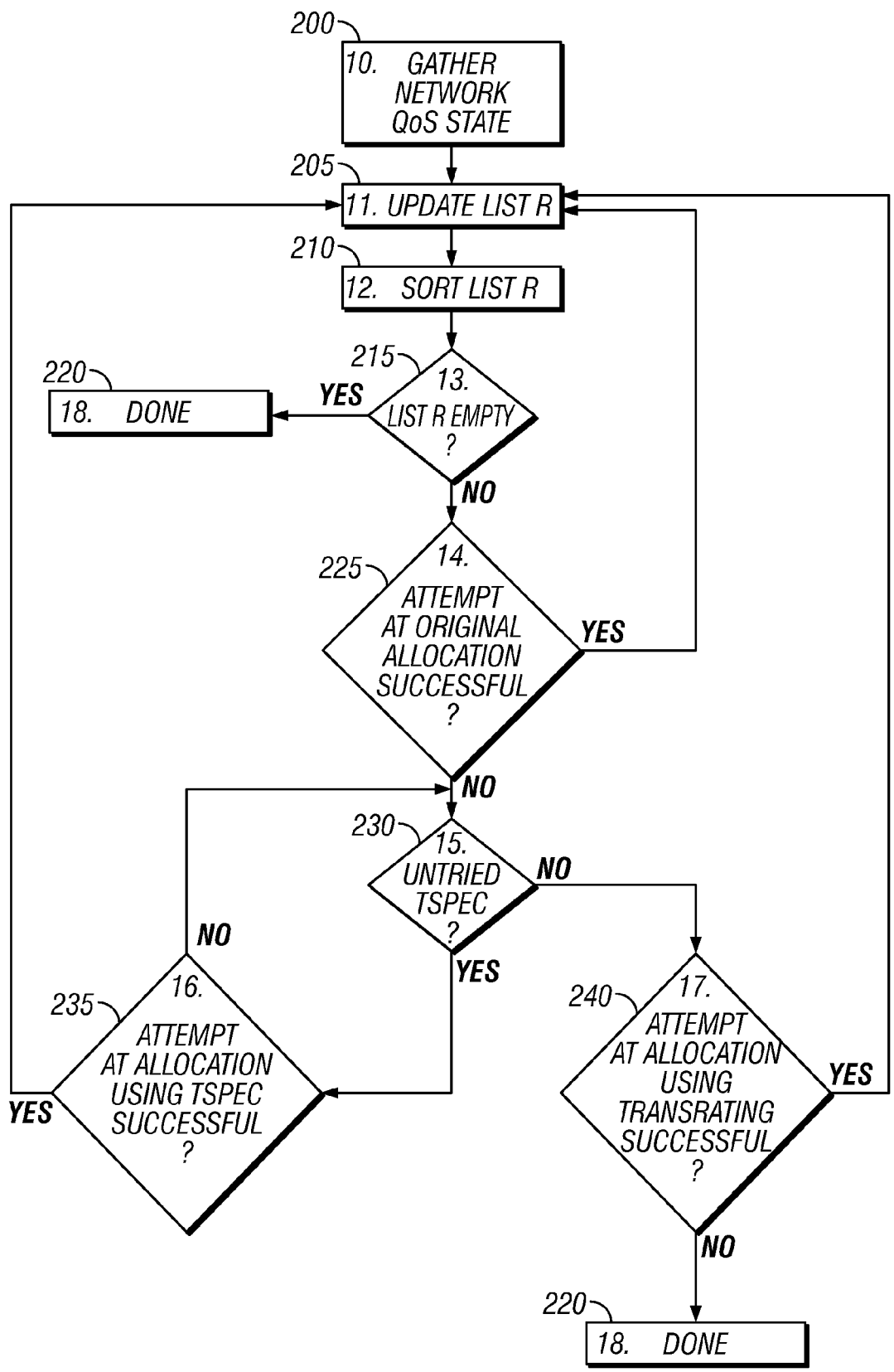
FIG. 3 is a flow chart illustrating the method of reallocating pre-empted allocations according to this invention.

Reallocation of Pre-Empted Allocations (FIG. 3)

10. Gather network QoS state (block 200) by identifying all traffic streams, their priority levels and their bandwidth allocations.

11. Update List R (block 205), using the updated information from step 10 to remove from List R any pre-empted allocations that have been re-requested and subsequently reallocated by another QM. This can occur when original requesters react to pre-emption notifications.

12. Sort List R (block 210) in descending order of priority level and ascending order of bandwidth allocation size (i.e., the first QoS allocation in List R is the pre-empted allocation in the highest priority level that has the largest bandwidth allocation size).

13. Determine if List R is empty (block 215), and if it is, then go to step 18. The reallocation process is complete (block 220).

14. If List R is not empty, then attempt to reallocate the first QoS configuration in List R (block 225) as it was originally allocated, and if successful remove it from List R and go to step 11.

15. If the reallocation attempt at block 225 is unsuccessful, then at block 230 determine if the first QoS allocation in List R has an untried TSPEC in its TrafficDescriptor.

16. If there is an untried TSPEC, then at block 235 attempt to reallocate the first QoS allocation in List R using the next untried TSPEC, and if successful remove it from List R go to step 11. If unsuccessful at block 235, repeat step 15 with the next untried TSPEC.

17. If there is no untried TSPEC at block 230, then attempt to reallocate the first QoS allocation in List R using transrating if available (block 240), and if successful remove it from List R and go to step 11. Transrating is the act of dynamically (during streaming) reducing the bitrate of an AV stream. This allows reduced bitrate versions of high bitrate streams to be sent over limited bandwidth network segments. This is usually CPU-intensive and often requires additional hardware support, limiting the number of streams that can be transrated by a transrator at any given time.

If the attempt at transrating at block 240 is not successful, then go to step 18. The reallocation process is complete (block 220).

18. The process is complete (block 220).

The description and illustration of the method of this invention has been made using the concept of lists. However, this is primarily for ease in describing the method. It is understood that the algorithm describing the method of this invention is implemented in software and is not limited specifically by steps of creating and sorting the traffic stream allocations and priority levels into actual lists. For example, the creation and sorting of Lists A, B and C is to enable the identification of the QoS allocation that should be the first one pre-empted. However, this may be accomplished by various other algorithms. For example, the processor that runs the QM may implement computer program instructions to search the QoS parameters in all traffic streams and then select the QoS allocation of a lowest-priority level traffic stream that has a bandwidth allocation size equal to or greater than the additional required bandwidth (ReqBW).

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for quality-of-service (QoS) management in a network that includes devices for transmitting and receiving data traffic streams, each traffic stream having a priority level and a bandwidth allocation, the method comprising: (a) receiving a device request to admit a new traffic stream having a bandwidth allocation greater than the available network bandwidth; (b) identifying the bandwidth allocations of all traffic streams on the network having the lowest of the priority levels that are lower than the priority level of the requested new traffic stream; (c) pre-empting the allocation of a lowest priority level allocation having an allocation equal to or greater than the additional required bandwidth (ReqBW); (d) if there is no lowest priority level allocation having an allocation equal to or greater than ReqBW in step (c), then pre-empting the allocations of lowest priority level allocations until the sum of pre-empted allocations is equal to or greater than ReqBW; (e) allocating ReqBW to the requested new traffic stream; (f) identifying the bandwidth allocations of all traffic streams on the network after the ReqBW has been allocated to the new traffic stream; (g) reallocating a pre-empted allocation if its required allocation is less than the available network bandwidth, and if its required allocation is greater than the available network bandwidth, then (h) determining if the pre-empted allocation is for a traffic stream available in a format requiring lesser bandwidth, and (i) reallocating the pre-empted allocation if its required lesser bandwidth allocation is less than the available network bandwidth; and wherein if in step (h) the pre-empted allocation is for an audio-video (AV) stream not available in a format requiring lesser bandwidth, then (j) during streaming of the AV stream, reducing the bitrate of the AV stream.

2. The method of claim 1 wherein step (b) comprises grouping the traffic streams, each group corresponding to a priority level, the lowest of the priority levels being in the lowest group; and wherein if after step (d) the sum of pre-empted allocations is less than ReqBW after all of the allocations in the lowest group have been pre-empted, then repeating steps (c) through (d) for the group having the next-lowest priority level.

3. The method of claim 1 further comprising, prior to pre-empting an allocation, notifying all devices whose allocations will be pre-empted.

4. The method of claim 1 wherein reallocating a pre-empted allocation comprises reallocating first the allocation of the traffic stream having the highest priority level of traffic streams with pre-empted allocations.

5. The method of claim 1 wherein each of the devices is a universal-plug-and-play (UPnP) device containing QoS Device Service, at least one of the UPnP devices contains a QoS Manager (QM), each traffic stream includes a TrafficDescriptor that contains QoS parameters representing priority level and bandwidth allocation, and at least one of the traffic streams is an audio-video (AV) stream.

6. The method of claim 1 wherein the network is a power-line communications (PLC) network.

7. A method for quality-of-service (QoS) bandwidth allocation in a network that includes universal-plug-and-play (UPnP) devices for transmitting and receiving traffic streams including audio-video (AV) traffic streams, each traffic stream including a TrafficDescriptor that contains a TrafficImportanceNumber (TIN) representing priority level for the traffic stream, each of the UPnP devices containing a processor and memory for storing QoS Device Service computer program instructions and at least one of the UPnP devices containing memory for storing QoS Manager (QM) computer program instructions, the processor-implemented method comprising the steps of: by the device containing the QM computer program instructions: (a) receiving a device request to admit a new traffic stream having a bandwidth allocation greater than the available network bandwidth; (b) identifying the group of traffic streams on the network having the lowest TIN that is lower than the TIN of the requested new traffic stream; (c) pre-empting the allocation of a traffic stream in said group having an allocation equal to or greater than the additional required bandwidth (ReqBW); (d) if there is no traffic stream in said group having an allocation equal to or greater than ReqBW in step (c), then pre-empting the allocations of traffic steams in said group until the sum of pre-empted allocations of traffic streams in said group is equal to or greater than ReqBW; (e) allocating ReqBW to the requested new traffic stream, and prior to pre-empting an allocation, notifying all devices whose allocations will be pre-empted; by a device receiving notification of an allocation to be pre-empted: if the allocation to be pre-empted is for an AV stream available in a format requiring lesser bandwidth than its current allocation, switching the AV stream whose allocation is to be pre-empted to a format requiring a lesser bandwidth allocation than its current allocation; and by the device containing the QM computer program instructions: (f) identifying the bandwidth allocations of all traffic streams on the network; (g) reallocating a pre-empted allocation if its required allocation is less than the available network bandwidth; (h) if the pre-empted allocation is for an AV stream whose required allocation is greater than the available network bandwidth and the AV stream is available in a format requiring lesser bandwidth; then (i) switching the AV stream whose allocation is pre-empted to a format requiring a lesser bandwidth, and if the AV stream is not available in a format requiring lesser bandwidth; then (j) during streaming of the AV stream, reducing the bitrate of the AV stream.

8. The method of claim 7 wherein if after step (d) the sum of pre-empted allocations is less than ReqBW after all of the allocations in said group have been pre-empted, then repeating steps (b) through (d) for the next-lowest TIN.

9. A quality-of-service (QoS) management device for connection to a local area network (LAN) having a plurality of network devices capable of transmitting and receiving data traffic streams including audio-video (AV) streams, each traffic stream having a priority level and a bandwidth allocation, the QoS management device having a processor and memory containing computer program instructions for performing the processor-implemented steps of: (a) receiving a request from a network device to admit a new traffic stream having a bandwidth allocation greater than the available network bandwidth; (b) identifying the bandwidth allocations of all traffic streams on the network having the lowest of the priority levels that are lower than the priority level of the requested new traffic stream; (c) pre-empting the allocation of a lowest priority level allocation having an allocation equal to or greater than the additional required bandwidth (ReqBW); (d) if there is no lowest priority level allocation having an allocation equal to or greater than ReqBW in step (c), then pre-empting the allocations of lowest-priority level allocations until the sum of pre-empted allocations is equal to or greater than ReqBW; (e) allocating ReqBW to the requested new traffic stream; prior to pre-empting an allocation, notifying all network devices whose allocations will be pre-empted, whereby a network device receiving a traffic stream whose allocation is to be pre-empted may switch the traffic stream to a format requiring a lesser bandwidth allocation; (f) identifying the bandwidth allocations of all traffic streams on the network; and (g) reallocating a pre-empted allocation if its required allocation is less than the available network bandwidth, and if it is not; then (h) determining if the pre-empted allocation is for a traffic stream available in a format requiring lesser bandwidth; and (i) reallocating the pre-empted allocation if its required lesser allocation is less than the available network bandwidth; wherein if in step (h) the pre-empted allocation is for an AV stream not available in a format requiring lesser bandwidth, then (j) during streaming of the AV stream, reducing the bitrate of the AV stream.

10. The QoS management device of claim 9 wherein the computer program instructions for reallocating a pre-empted allocation include instructions for reallocating first the allocation of the traffic stream having the highest priority level of traffic streams with pre-empted allocations.

* * * * *